United States Patent [19]

Bender et al.

[11] Patent Number: 5,540,405
[45] Date of Patent: Jul. 30, 1996

[54] METHOD AND APPARATUS FOR COMPENSATING FOR MAGNETIC DISTURBANCE TORQUES ON A SATELLITE

[75] Inventors: Douglas J. Bender, Redondo Beach; William F. Hummel, Los Angeles, both of Calif.

[73] Assignee: Hughes Aircraft Company, Los Angeles, Calif.

[21] Appl. No.: 89,381

[22] Filed: Jul. 9, 1993

Related U.S. Application Data

[63] Continuation of Ser. No. 800,776, Nov. 27, 1991, abandoned.

[51] Int. Cl.$^6$ .............................. B64G 1/24; B64G 1/32
[52] U.S. Cl. .................... 244/166; 244/164; 364/434
[58] Field of Search ........................ 244/166, 164, 244/171, 173, 165; 364/433, 434

[56] References Cited

U.S. PATENT DOCUMENTS

| | | | |
|---|---|---|---|
| Re. 29,177 | 4/1977 | Michaelis | 244/166 |
| 3,190,581 | 6/1965 | Wilson, Jr. | 244/166 |
| 3,232,561 | 2/1966 | Adams | 244/166 |
| 3,834,653 | 9/1974 | Perkel . | |
| 4,010,921 | 3/1977 | Pistiner et al. | 244/165 |
| 4,062,509 | 12/1977 | Muhlfelder et al. | 244/166 |
| 4,084,773 | 4/1978 | Schmidt | 244/166 |
| 4,114,841 | 9/1978 | Muhlfelder | 244/166 |
| 4,188,666 | 2/1980 | Legrand et al. | 244/164 |
| 4,424,948 | 1/1984 | Muhlfelder | 244/169 |
| 4,489,383 | 12/1984 | Schmidt | 244/166 |
| 4,537,375 | 8/1985 | Chan | 244/164 |
| 4,591,118 | 5/1986 | Chan | 244/164 |
| 4,746,085 | 5/1988 | Brüderle | 244/166 |
| 4,827,422 | 5/1989 | Savoca | 364/434 |
| 4,883,244 | 11/1989 | Challoner | 244/171 |
| 4,916,622 | 4/1990 | Raman | 244/166 |
| 5,058,835 | 10/1991 | Goodzeit et al. | 244/165 |

*Primary Examiner*—Andres Kashnikow
*Assistant Examiner*—Virna Lissi Mojica
*Attorney, Agent, or Firm*—Elizabeth E. Leitereg; Terje Gudmestad; Wanda K. Denson-Low

[57] ABSTRACT

This invention discloses a method for compensating for the disturbance torque on an orbiting satellite (10) from the interference of the earth's magnetic field lines with particular current loops associated with the satellite (10). The current flow in these current loops on the satellite (10) is measured by a current sensing device (42). A scaling factor (44,46) is applied to the measured currents to derive an estimated disturbance torque in particular axes of the satellite's attitude. The estimated magnetic disturbance torques are applied, along with other control torques, to a satellite actuation device (38). The actuation device (38) actuates the satellite (10) in the particular axes to compensate for the disturbance torques being applied to the satellite (10).

9 Claims, 3 Drawing Sheets

METHOD AND APPARATUS FOR COMPENSATING FOR MAGNETIC DISTURBANCE TORQUES ON A SATELLITE

This is a continuation of application Ser. No. 07/800,776, filed Nov. 27, 1991, now abandoned.

BACKGROUND OF THE INVENTION

1. Technical Field

The present invention relates generally to a method for maintaining an orbiting satellite's pointing direction fixed, and more particularly, to a method for compensating for magnetic disturbance torques inflicted on a satellite in an earth orbit.

2. Discussion

A geosynchronous earth orbit, as is known in the art, is the orbit about the earth in which a satellite or spacecraft will remain fixed above a specific location on the earth. This orbit is at a distance of approximately 22,400 miles above the earth. In this orbit, a beam, such as a communications beam, from the satellite can be maintained over a desirable area on the earth, such as a particular country, thus establishing an area which will receive the beam. To remain in a geosynchronous orbit it is necessary that the satellite be in an orbit substantially within the equatorial plane of the earth at the desirable distance, and that the satellite's attitude be oriented perpendicular to this plane. Any deviation or disturbance which causes the satellite to direct its antenna away from a boresight location on the earth tends to effect the coverage area of the beam, and thus, produces undesirable results. Many different forces are in effect on the satellite which tend to alter the satellite's antenna pointing direction.

As a first order method for countering the effects of the different forces acting on the satellite, it is known to stabilize the satellite's attitude by providing an angular bias momentum which resists changes in the satellite's orientation due to external forces transverse to the bias momentum axis. Satellites using this technique are generally referred to as "momentum bias" satellites. Angular momentum bias is usually provided by a number of momentum or reaction wheels which spin at least part of the satellite. The bias axis set by the spin of the momentum wheels is generally perpendicular to the direction of the orbit of the satellite. Although the bias momentum resists changes in the satellite's orientation in directions transverse to the bias momentum axis, it is still necessary to provide control for correcting variations in the satellite's orientation along the bias axis. Different methods of controlling the satellite's attitude, such as feedback loops, are known in the art.

For most bias momentum satellites, the satellite payload, i.e., the part of the satellite carrying at least the antenna, is oriented differently than the momentum wheel. It is therefore necessary to provide means for correcting the orientation of the payload with respect to the orientation of the momentum attitude. Typically, the satellite's payload is defined in three axes referred to as the yaw, roll and pitch axes. If the satellite is in a geosynchronous orbit, the yaw axis is generally directed from the satellite to the center of the earth, the pitch axis is generally directed normal to the plane of the orbit of the satellite and the roll axis is generally perpendicular to the yaw and pitch axes, in a direction of travel of the satellite as is well known in the art.

As discussed above, different forces or disturbances act on an orbiting satellite causing the satellite to direct its pointing away from the desirable boresight location. One of those forces is caused by the earth's magnetic field. In the absence of magnetic storms, the earth's magnetic field at a geosynchronous altitude is about 110 nano-teslas oriented along the north pole of the earth. The earth's magnetic field can interact with electrical current loops on the satellite to produce a deviating torque to the satellite's attitude. Certain satellite wire harness designs may result in large current loops on the satellite, especially during periods of battery discharge such as would occur during an eclipse of the satellite's photodetectors when the satellite is obstructed from the sun by the earth. For example, a pointing error of approximately 0.2° in the yaw direction would occur due to a 60 µNm disturbance torque in the yaw direction applied to the satellite during a one hour eclipse period. Such a torque would arise from a current loop in the roll direction on the satellite of approximately 200 A-turn-m². Consequently, a significant pointing error will occur in the yaw direction altering the satellite's boresight location.

What is needed then is a method of compensating for the deviations in a satellite's attitude caused by the forces of the earth's magnetic field on the wiring in the satellite. It is therefore one objective of the present invention to provide such a method.

SUMMARY OF THE INVENTION

Disclosed is a method of compensating for the disturbance effects of the earth's magnetic field on current loops within an orbiting satellite. To do this it is proposed to measure the electrical current passing through the major, or significant, current loops traveling in particular directions within the satellite. Typically, these directions will be along the yaw and roll axes of the satellite. The measured currents are then multiplied by a scale factor to derive predicted disturbance torques in these axes. The predicted disturbance torques are then fed into the satellite's attitude control system which develop the satellite's control torques. These control system would typically compute control torques based on filtered inertial measurements by sensors which measure attitude offset. Control torques equal and opposite to the predicted magnetic disturbance torques are then added to the satellite's other control torques. The summed control torque is then applied to the actuators controlling the satellite's attitude in particular directions.

In one particular implementation, the control actuation would be performed by a momentum wheel platform assembly. In addition, the control actuation could be implemented in an observer-controller format and disturbance torques could be explicitly estimated. In this case, the compensation for the magnetic disturbance torques could be accomplished by adjusting the estimated disturbance torques.

Additional objects, advantages, and features of the present invention will become apparent from the following description and appended claims, taken into conjunction with the accompanying drawings.

DETAILED DESCRIPTION OF THE PREFERRED EMBODIMENT

The following discussion of the preferred embodiments concerning magnetic disturbance compensation of a satellite's attitude is merely exemplary in nature and is in no way intended to limit the invention or its application or uses.

Figure 1:
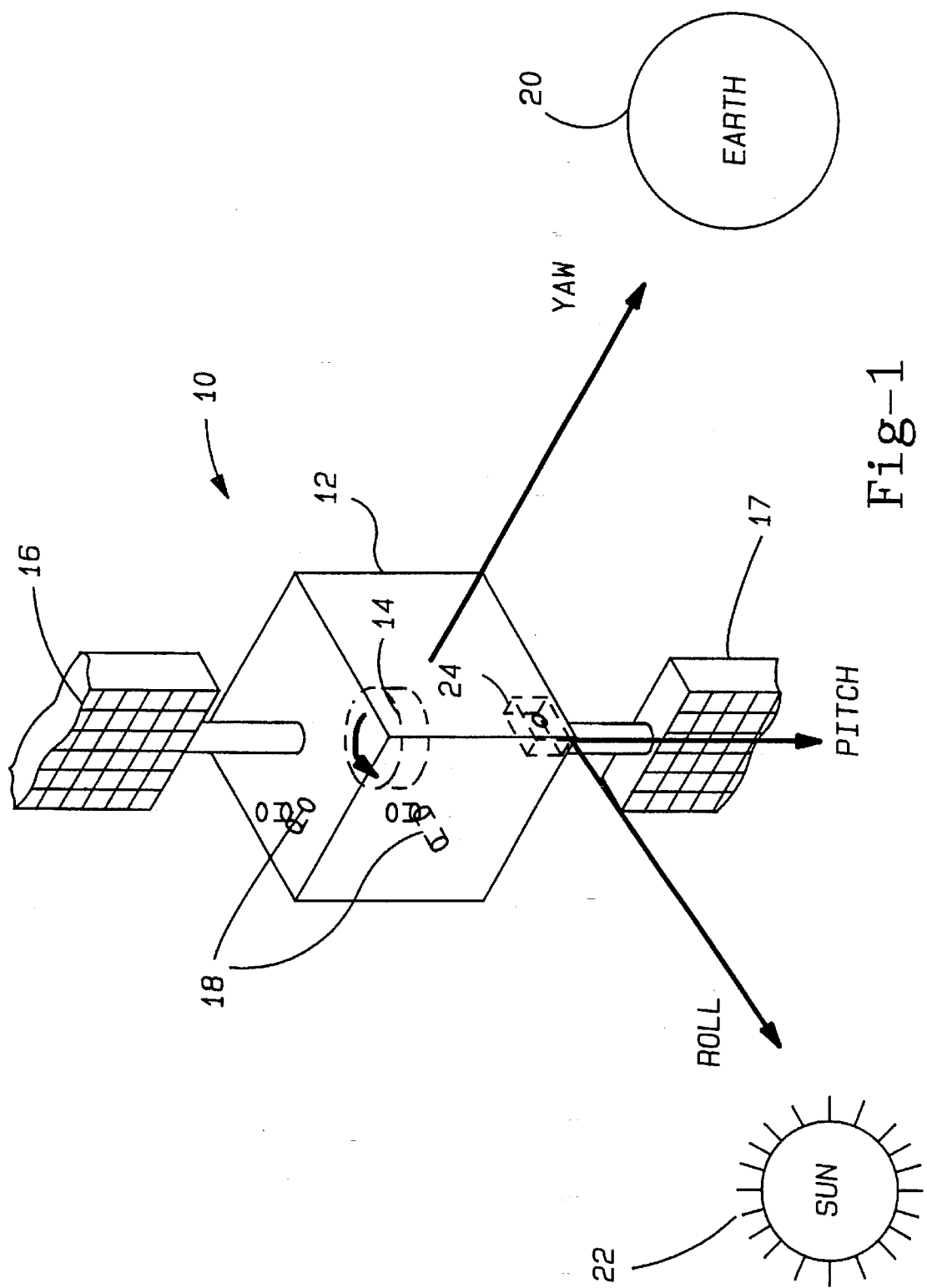
FIG. 1 is a diagram of a momentum bias satellite orbiting the earth which may incorporate an attitude compensation system according to the invention.

Before going on to the specifics of the invention, it may be helpful to get an overview of the type of satellite which may incorporate the invention. To get this understanding, first turn to FIG. 1. In FIG. 1, the relationship of a momentum bias satellite 10 orbiting the earth 20 and relative to the sun 22 is shown. Satellite 10 includes a satellite central body 12, here depicted as a cube. By representing body 12 of satellite 10 as a cube it is easier to visualize the coordinates of the satellite's axes of yaw, roll and pitch. As discussed above, the yaw axis is the axis directed from the attitude of the satellite body 12 to the center of the earth 20, the pitch axis is directed normal to the orbit of satellite 10 and normal to the yaw axis, and the roll axis is perpendicular to the yaw and pitch axes, in a direction along travel of satellite 10. Each of these axes are shown in a directional manner in FIG. 1.

Satellite 10 includes a momentum wheel 14 which spins in a particular direction, here counter clockwise as shown, in order to stabilize satellite 10 in its orbit. The axis of rotation of momentum wheel 14 is generally parallel to the pitch axis of the satellite body 12. The momentum wheel 14 is typically oriented separate from the reference of the satellite body 12. In one example, the orientation of the momentum wheel 14 will be on a 2-axis gimbal. The momentum wheel 14, in this example, is an actuator which adjusts and maintains the satellite's attitude. The pitch axis and momentum axis would be oriented substantially perpendicular to the equatorial plane of the earth 20 if satellite 10 were in a geosynchronous orbit.

Satellite 10 further includes an array of integrating gyros 18 and a thermopile earth sensor 24. Integrating gyros are generally used to orient the satellite 10 in a desirable configuration when the satellite 10 reaches its geosynchronous altitude as is known in the art. In normal operation of satellite 10, integrating gyros 18 would not be used. Earth sensor 24, sometimes referred to as a horizon sensor, senses the horizon of the earth in order to establish an inertial reference frame for the proper orientation of the satellite 10. An earth sensor will typically measure the satellite's orientation in the roll and pitch directions. Other types of sensors, including but not limited to star sensors, sun sensors, gyros and ground beacon sensors, could also provide the necessary sensing of the satellite's attitude. Projecting from satellite body 12 are dual solar wings 16 and 17 shown here in a cut-away format. Solar wings 16 and 17 are directed perpendicular to the rays of the sun in order to provide the necessary power to the systems on satellite 10.

As discussed briefly above, in the absence of magnetic storms, the earth's magnetic field at a geosynchronous altitude is a near constant 110 nano-teslas oriented along the north pole of the earth. This magnetic field may interact with particular current loops on an orbiting satellite to produce a disturbance torque according to the equation:

$$T=I \times B,$$

where T, I and B are vector quantities representing the disturbance torque, and the vector sum of the satellite's current loops and the earth's magnetic field, respectively. If the current loops in the three axes of pitch, roll and yaw of the satellite can be measured, the disturbance torque in these directions can be predicted according to this equation. Since the earth's magnetic field is aligned with the earth's poles, in a geosynchronous equatorial orbit the primary disturbance torques will be in a satellite's roll and yaw axes, caused by current loops in the satellite's yaw and roll axes respectively since the pitch axis is substantially aligned with the magnetic field lines. In addition, in a momentum bias satellite, the roll and yaw axes are the more difficult axes to control and thus the more important in which to compensate known disturbance torques.

According to one preferred embodiment, this invention proposes providing a device for measuring the electrical current passing through the major current loops travelling in a satellite's roll and yaw axes. The measured currents are then multiplied by a scale factor to derive predicted torques, substantially the same as the disturbance torques which would be caused by the earth's magnetic field from the current in these current loops, in the satellite's roll and yaw axes, respectively, according to the following equations:

$$\hat{T}_r^m = K_r I_y$$

$$\hat{T}_y^m = K_y I_r$$

where $\hat{T}_r^m$ and $\hat{T}_y^m$ are the predicted roll and yaw magnetic disturbance torques, respectively; $I_r$ and $I_y$ are the measured currents in the roll and yaw current loops, respectively; and $K_r$ and $K_y$ are predetermined scale factors computed to implement the roll and yaw components of the disturbance torque equation above.

Figure 2:
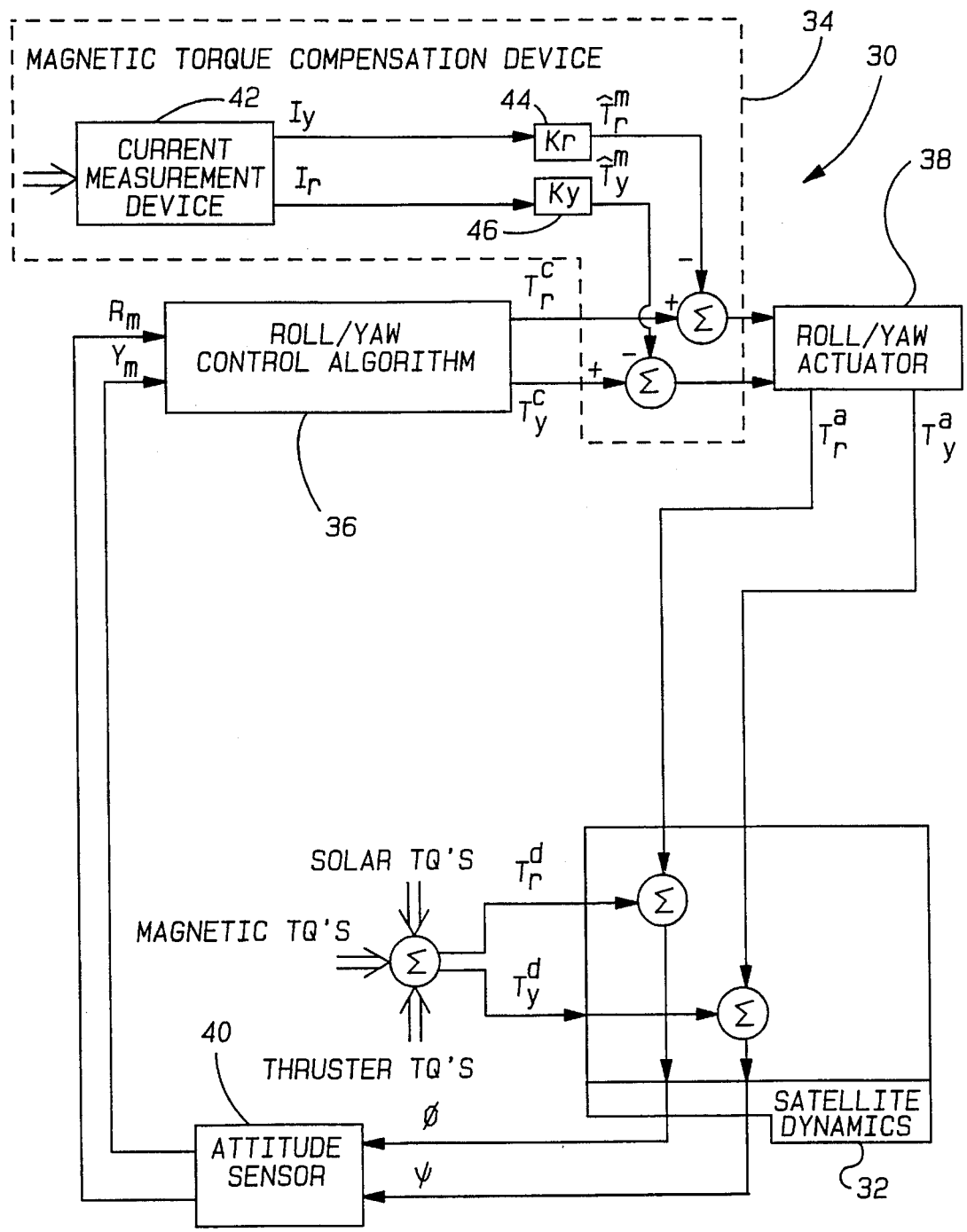
FIG. 2 is a block diagram schematic representing the invention according to one preferred embodiment of the present invention.

FIG. 2 represents one implementation, according to a preferred embodiment of the present invention, which compensates for magnetic torque disturbances. More particularly, FIG. 2 shows a system 30 depicted in a block diagram format including satellite dynamics 32, a magnetic torque compensation device 34, a roll/yaw control algorithm 36, a roll/yaw actuator 38 and an attitude sensor 40 connected as shown. Satellite dynamics 32 represents the satellite itself as being acted on by the different control and disturbance torques as will be described. The magnetic torque compensation device 34 calculates the predicted magnetic disturbance torque. The roll/yaw control algorithm 36 computes control torques based on filtered inertial measurements from sensor 40, such as an earth sensor, a sun sensor, a star sensor, etc. as discussed above.

Different disturbance torques act on the satellite dynamics 32. Depicted here are the disturbance torques of solar pressure, magnetic disturbance and thruster disturbance. This is not an inclusive list as other disturbance torques may also be present. In this example only the disturbance torques $T_r^d$ and $T_y^d$ in the roll and yaw directions, respectively, are shown acting on satellite dynamics 32 because they are the most destructive to satellite pointing. In order to compensate for the effects that these disturbance torques have on the satellite dynamics 32, the satellite's attitude is sensed relative to a fixed inertial frame by attitude sensor 40. Attitude sensor 40 senses the angles of $\phi$ and $\psi$ of the satellite's roll and yaw axes, as shown. These angles are measured by sensor 40 in order to provide roll and yaw measurements $R_m$ and $Y_m$ to calculate the control torques necessary to compensate for deviation in the desirable satellite attitude caused by the disturbance torques. The measurements of $R_m$ and $Y_m$ are applied to roll/yaw control algorithm 36. Roll/yaw control algorithm 36 derives control torques in the roll and yaw direction of $T_r^c$ and $T_y^c$ in order to compensate for the amount that the satellite attitude from a desired attitude is offset as sensed by attitude sensor 40. In order to compensate for the effect that the magnetic disturbance has on the satellite dynamics 32, magnetic torque compensation device 34 is used. Predicted roll and yaw torques $\hat{T}_r^m$ and $\hat{T}_y^m$ from compensation device 34 are added to the roll and yaw control torques $T_r^c$ and $T_y^c$ from the roll/yaw control algorithm 36. The combination of these torques are then applied to a roll/yaw actuator 38. Roll/yaw actuator 38 is momentum wheel 14 in our example above, or it can be any other appropriate actuation device, such as a reaction wheel, thrusters, control moment gyros, etc. Output torques $T_r^a$ and $T_y^a$ from actuator 38 for the roll and yaw axes, respectively, are applied to the satellite dynamics 32. In this respect, the disturbance torques of $T_r^d$ and $T_y^d$ are compensated for such that the satellite attitude is maintained in a desirable orientation.

Magnetic torque compensation device 34 provides the inventive concept of the present invention in this embodiment. Magnetic torque compensation device 34 includes a current measurement device 42 and scale factor components 44 and 46, as shown. The current measurement device 42 can be any applicable current measuring device known in the art. Current measurement device 42 measures the current flowing through predetermined electrical current loops traveling through the satellite. The measured current from these loops is applied as current outputs $I_y$ and $I_r$ for the yaw and roll currents measured in amp-turn-m$_2$, respectively. The $I_y$ yaw axis current loop measurement is applied to scale factor component 44. A scale factor $K_r$ is applied to current $I_y$ to develop $\hat{T}_r^m$ as the estimated roll disturbance. The $I_r$ roll current loop measurement is applied to scale factor component 46. Scale factor component 46 applies the scale factor $K_y$ to the roll current $I_r$ to develop the estimated torque disturbance $\hat{T}_y^m$ in the yaw direction. The scale factors $K_r$ and $K_y$ are predetermined factors based on the anticipated affect the magnetic field strength would have on the current loops. As discussed above, $\hat{T}_r^m$ and $\hat{T}_y^m$ are applied to summing devices along with the control torques $T_r^c$ and $T_y^c$ to drive the control torques applied to actuator 38.

Figure 3:
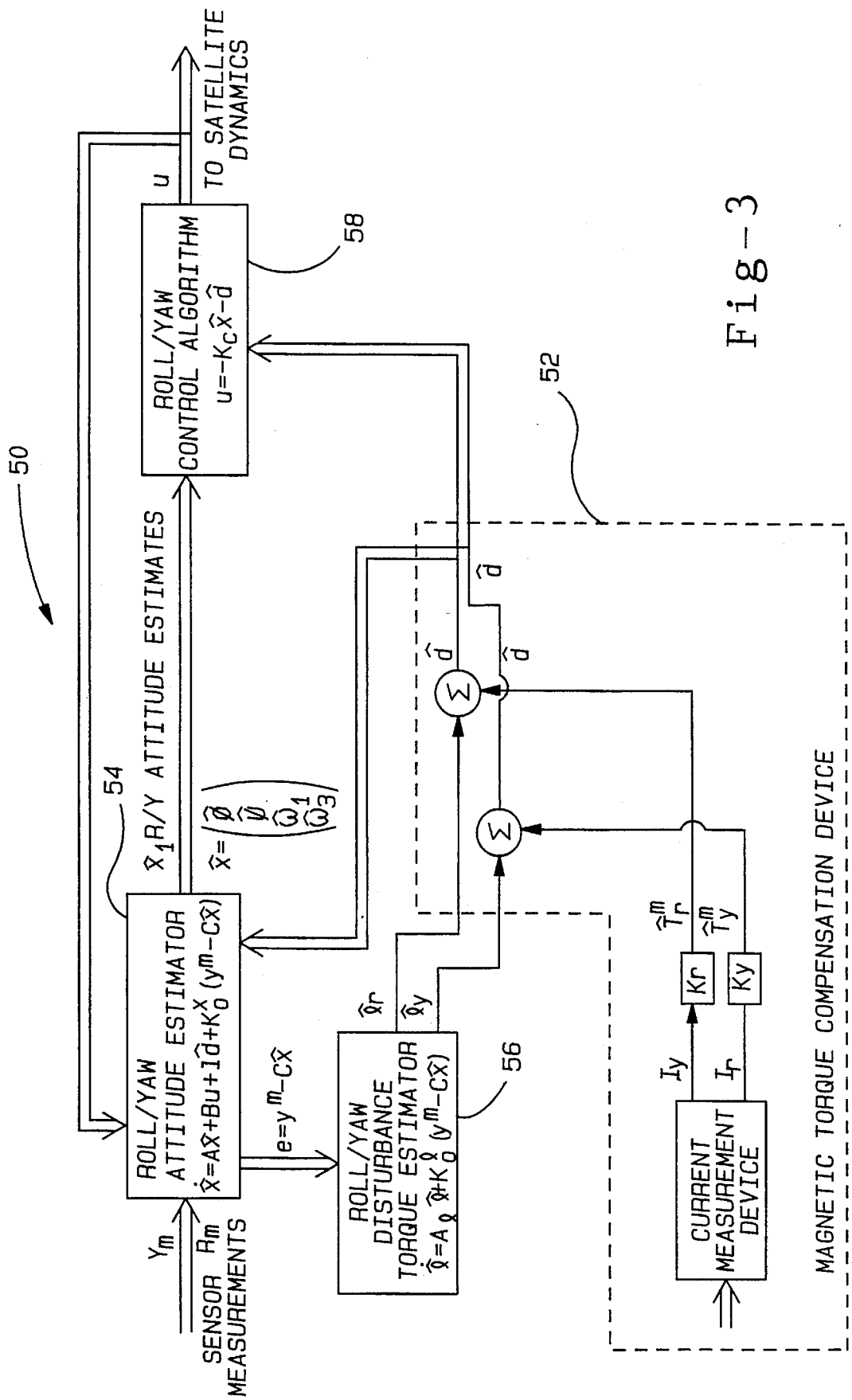
FIG. 3 is a block diagram schematic representing the invention in an observer-controller format according to a preferred embodiment of the present invention.

FIG. 3 shows one implementation incorporating the above-described magnetic torque compensation system in that an observer-controller format is used to estimate the disturbance torques by an onboard computer on the satellite. FIG. 3 shows a system 50 which includes a magnetic torque compensation device 52 identical to that of magnetic torque compensation device 34 described above and a roll/yaw control algorithm 58. In this implementation, the roll and yaw sensor measurements $R_m$ and $Y_m$ from attitude sensor 40, as discussed above, are applied to a roll/yaw attitude estimator circuit 54 which determines the satellite attitude from the differential equation:

$$\dot{\hat{x}}=A\hat{x}+Bu+L\hat{d}+K_o^x(Y^m-C\hat{x})$$

This differential equation is a known function which includes a scheme of matrices which would be precalculated prior to launch of the satellite. More particularly:

x is the state vector representing the instantaneous state of the satellite dynamics as modeled in the estimator circuit;
$\hat{x}$ is the estimate of x;
$\dot{\hat{x}}$ is the time-derivative of $\hat{x}$;
u is the control input to the satellite dynamics;
$\hat{d}$ is the estimate of the disturbance acting on the satellite dynamics;
$K_o^x$ is the estimator gain matrix; and
A,B,C and L represent the satellite dynamics, as modeled in the observer.

An error function $e=y^m-C\hat{x}$ derived from the above equation is applied to a roll/yaw disturbance torque estimator 56. The roll/yaw disturbance torque estimator 56 is an algorithm $\dot{\hat{1}}=A_I\hat{1}+K_o^I(y^m-C\hat{x})$. In this algorithm, $\hat{1}$ is a vector whose elements include estimates of all disturbance torques not specifically modeled by the magnetic torque compensating device 52. This includes residual errors between the predicted magnetic torques ($\hat{T}_r^m$ and $\hat{T}_y^m$) and the actual magnetic torques as well as other disturbance torques of non-magnetic origin, such as solar torques.

The result of the estimator algorithm of the roll/yaw disturbance torque estimator 56 is applied as the values $\hat{1}_r$ and $\hat{1}_y$ as estimated disturbance torques along with the estimated magnetic disturbance torques $\hat{T}_r^m$ and $\hat{T}_y^m$ from magnetic torque compensation device 52 to derive estimated disturbances $\hat{d}_r$ and $\hat{d}_y$ in the roll and yaw axes, respectively. These estimated disturbance values $\hat{d}_r$ and $\hat{d}_y$ are applied to roll/yaw control algorithm 58, similar to roll/yaw control algorithm 36 above, and to the roll/yaw attitude estimator 54 to update the satellite's attitude. Also applied to roll/yaw control algorithm 58 are the attitude estimates from the roll/yaw attitude estimator 54. The combination of the attitude estimates $\hat{x}_r$ and $\hat{x}_y$ and the estimated disturbance torques $\hat{d}_r$ and $\hat{d}_y$ are computed by the function $u=-K_c\hat{x}-\hat{d}$ and applied by the roll/yaw actuator 38, as discussed above, to compensate the satellite dynamics 32.

The above systems are directed towards magnetic disturbance torque compensation schemes which measure the magnetic torque continuously. In a simplified version of these systems, it is possible to only measure the magnetic disturbance torques periodically, such as during solar eclipses, i.e. where the orbiting satellite is at least partially shielded from the sun by the earth. In this application, only the most important magnetic disturbances would be measured during the switch from battery charging to discharging, as would occur during an eclipse, because during the eclipse rapidly changing magnetic torques result in sizable satellite pointing transients. For this implementation, eclipses could be detected by observing the operation of a battery discharge controller associated with the satellite. This simplification can be realized by the fact that the predicted magnetic torque disturbances $\hat{T}_r^m$ and $\hat{T}_y^m$ would only have two values, one for eclipse periods and one for all other times. When the battery discharge controller indicates that an eclipse was in progress, $\hat{T}_r^m$ and $\hat{T}_y^m$ would be switched to their eclipse values.

It should be noted that the discussion above particularly references the roll and yaw axes due to the fact that a satellite in the geosynchronous orbit may exhibit significant magnetic disturbances in these directions. However, the system need not be limited to these axes and as such can be incorporated to include all satellite axes. In addition, this system can be incorporated in satellites at any orbit. Further, it is possible through on-satellite software to program and adjust the satellite parameters while the satellite is in orbit.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. An apparatus for compensating for disturbances on an orbiting satellite, said apparatus being associated with said satellite, said apparatus comprising:

actuation means for actuating the satellite in at least one predetermined satellite axis in response to particular satellite attitude compensation control signals;

control means for providing the compensation control signals to the actuation means in the at least one predetermined axis, said control means receiving satellite attitude measurement signals from a sensor;

a magnetic torque compensation device, said magnetic torque compensation device computing an estimated magnetic torque disturbance signal in the at least one predetermined axis and applying the estimated magnetic torque disturbance control signal to the actuation means to compensate for magnetic disturbances on the satellite, wherein said magnetic torque compensation device computes an estimated magnetic torque disturbance at predetermined times;

solar eclipse detecting means for detecting when the satellite is at least being partially eclipsed from the sun, said eclipse detecting means providing a signal to the magnetic torque compensation device at times when an eclipse is detected in order to compute the estimated magnetic torque disturbance, wherein the solar eclipse detection means includes current sensing means for measuring the current in a circuit associated with the satellite, said circuit carrying current indicative of whether a satellite battery is discharging when the satellite is eclipsed.

2. A method of maintaining an orbiting satellite in a predetermined satellite attitude against the disturbance torque caused by a magnetic field on current loops in the satellite, said method comprising the steps of:

measuring the angle of the satellite's attitude relative to at least one predetermined axis;

applying the measured angle of the at least one predetermined axis to a control system;

calculating compensating control torques in the at least one predetermined axis to correct the attitude of the satellite in the at least one predetermined axis to a predetermined desirable satellite attitude position;

determining an estimated magnetic torque disturbance on the satellite;

applying the control torques to a satellite actuation device;

applying the estimated magnetic torque to the actuation device;

actuating the satellite in response to the control torques and the estimated magnetic torque, wherein the step of determining an estimated magnetic torque includes determining an estimated magnetic torque only during predetermined times; and detecting when the satellite is at least being partially eclipsed from the sun and providing a signal to the magnetic torque compensation device at times when the eclipse is detected in order to compute the estimated magnetic torque disturbance during the eclipse, wherein the step of detecting when the satellite is being at least partially eclipsed by the sun includes measuring current in a circuit associated with the satellite which carries current indicative of a satellite battery being discharged.

3. An attitude control system for controlling the attitude of said satellite, said attitude control system comprising:

actuation means for adjusting and maintaining the attitude of the satellite; and magnetic disturbance torque compensating apparatus for compensating for a magnetic disturbance torque caused by interaction between electrical currents flowing in electrical circuits on board said satellite and a magnetic field through which said satellite is moving, wherein said compensating apparatus estimates the magnetic disturbance torque, produces an estimated magnetic disturbance control signal in response to the estimated magnetic disturbance torque, and applies the estimated magnetic torque disturbance control signal to said actuation means, the estimated magnetic disturbance control signal being substantially equal in magnitude and opposite in direction to the estimated magnetic disturbance torque in order to compensate for the estimated magnetic disturbance torque.

4. The invention according to claim 3 wherein said magnetic disturbance torque compensating apparatus comprises a current measuring means for measuring the electrical current in particular electrical circuits on board said satellite and a scale means for applying a scale factor to the measured current to compute the estimated magnetic torque disturbance control signal such that the estimated magnetic torque disturbance control signal is substantially equal in magnitude with the estimated magnetic disturbance torque.

5. The invention according to claim 3 wherein said magnetic field through which said satellite is moving is the Earth's magnetic field.

6. The invention according to claim 3 wherein said actuation means is selected from the group consisting of a momentum or reaction wheel, thrusters and control moment gyros.

7. The invention according to claim 3 wherein said magnetic disturbance torque compensating apparatus estimates the magnetic disturbance torque at predetermined times.

8. A method for maintaining an orbiting satellite in a predetermined attitude against magnetic disturbance torques caused by interaction between electrical currents flowing in electrical circuits on board said satellite and a magnetic field through which said satellite is moving, said satellite having an attitude control system for controlling the attitude of said satellite, said attitude control system including actuation means for adjusting and maintaining the attitude of the satellite, said method comprising the steps of:

estimating the magnetic disturbance torque;

producing an estimated magnetic torque disturbance control signal in response to the estimated magnetic disturbance torque; and applying the estimated magnetic torque disturbance control signal to said actuation means, the estimated magnetic disturbance control signal being substantially equal in magnitude and opposite in direction to the estimated magnetic disturbance torque in order to compensate for the estimated magnetic disturbance torque.

9. The method according to claim 8 wherein the step of estimating the magnetic disturbance torque comprises measuring the electrical current in particular electrical circuits on board said satellite and applying a scale factor to the measured current to compute the estimated magnetic torque disturbance control signal such that the estimated magnetic torque disturbance control signal is substantially equal in magnitude with the magnetic disturbance torque.

* * * * *